US010217148B2

(12) United States Patent
Abbasi Moghaddam et al.

(10) Patent No.: US 10,217,148 B2
(45) Date of Patent: Feb. 26, 2019

(54) PREDICTING A STATUS OF A TRANSACTION

(71) Applicant: eBay Inc., San Jose, CA (US)

(72) Inventors: Samaneh Abbasi Moghaddam, Sunnyvale, CA (US); Jerry Louis, Dublin, CA (US); Vipul C. Dalal, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 688 days.

(21) Appl. No.: 14/725,977

(22) Filed: May 29, 2015

(65) Prior Publication Data

US 2016/0217513 A1 Jul. 28, 2016

Related U.S. Application Data

(60) Provisional application No. 62/107,255, filed on Jan. 23, 2015.

(51) Int. Cl.
*G06Q 30/06* (2012.01)
*G06Q 10/06* (2012.01)

(52) U.S. Cl.
CPC ....... *G06Q 30/0609* (2013.01); *G06Q 10/067* (2013.01)

(58) Field of Classification Search
CPC ............ G06Q 30/0609; G06Q 10/067; G06Q 10/0631; G06F 17/30994; G06N 99/005
USPC ......... 705/26.35, 26.1, 301, 348, 7.12, 7.38; 709/248; 707/758
See application file for complete search history.

(56) References Cited

U.S. PATENT DOCUMENTS

| 8,417,715 B1* | 4/2013 | Bruckhaus | ........ G06F 17/30994 |
| | | | 705/26.1 |
| 8,473,447 B2* | 6/2013 | Yoon | .................... G06N 99/005 |
| | | | 700/93 |
| 2009/0234710 A1* | 9/2009 | Belgaied Hassine | .. G06Q 30/02 |
| | | | 705/7.29 |
| 2009/0319420 A1* | 12/2009 | Sanchez | ................. G06Q 40/00 |
| | | | 705/38 |
| 2011/0066558 A1* | 3/2011 | Bassin | ................ G06F 11/3616 |
| | | | 705/301 |

(Continued)

OTHER PUBLICATIONS

Amit, Yali, et al., "Shape Quantization and Recognition and Randomized Trees", Neural Computation 9 (7), [Online]. Retrieved from the Internet: <URL: http://www.mitpressjournals.org/doi/abs/10.1162/neco.1997.9.7.1545>, (1997), 1545-1588.

(Continued)

*Primary Examiner* — Vanel Frenel
(74) *Attorney, Agent, or Firm* — Shook, Hardy & Bacon L.L.P.

(57) ABSTRACT

Methods, systems, and apparatus for predicting a status of a transaction are described. Feature data related to one or more transactions is collected and a subset of features is selected for use in predicting the status of the transaction. A model is trained using the collected feature data that corresponds to the selected features, and the model is applied to feature data of a selected transaction to generate a probability of the selected transaction attaining one or more defined statuses. Mitigating or preventive actions are performed based on the generated probability.

20 Claims, 12 Drawing Sheets

(56) References Cited

U.S. PATENT DOCUMENTS

| | | | | |
|---|---|---|---|---|
| 2011/0238614 A1* | 9/2011 | Yoon | ............ | G06N 99/005 |
| | | | | 706/52 |
| 2012/0284140 A1* | 11/2012 | Hoff | ............ | G06Q 30/08 |
| | | | | 705/26.3 |
| 2014/0180738 A1* | 6/2014 | Phillipps | ............ | G06N 99/005 |
| | | | | 705/7.12 |
| 2014/0372513 A1* | 12/2014 | Jones | ............ | G06F 9/5072 |
| | | | | 709/203 |
| 2014/0379411 A1* | 12/2014 | Earle | ............ | G06Q 10/06315 |
| | | | | 705/7.25 |
| 2015/0193775 A1* | 7/2015 | Douglas | ............ | G06Q 20/4016 |
| | | | | 705/14.23 |
| 2015/0254641 A1* | 9/2015 | Bondesen | ............ | G06Q 20/363 |
| | | | | 705/41 |
| 2015/0332248 A1* | 11/2015 | Weksler | ............ | G06Q 20/3226 |
| | | | | 705/71 |
| 2016/0148214 A1* | 5/2016 | Stibel | ............ | G06Q 20/4016 |
| | | | | 705/44 |

OTHER PUBLICATIONS

Cortes, Corinna, et al., "Support-Vector Networks", Machine Learning 20(3), (1995), 273-297.

Guyon, Isabelle, "An introduction to variable and feature selection.", The Journal of Machine Learning Research 3, (2003), 1157-1182.

Ho, Tin Kam, "The Random Subspace Method for Constructing Decision Forests", IEEE Transactions on Pattern Analysis and Machine Intelligence 20 (8), (1998), 832-844.

Nelder, John A, et al., "Generalized Linear Models", Journal of the Royal Statistical Society, Series A (Royal Statistical Society) 135 (3), (1972), 370-384.

* cited by examiner

FIG. 4

| FEATURE VALUE(S) | PREDICTED STATUS | PROBABILITY OF ATTAINING STATUS |
|---|---|---|
| ITEM=USED AND BUYER=NEW | UNPAID ITEM | .04 |
| BUYER=NEW AND SELLER=LOW RATING | UNPAID ITEM AND ITEM NOT AS DESCRIBED | .12 |
| ITEM=NEW AND SELLER=LOW RATING | ITEM NOT RECEIVED | .03 |
| ITEM=USED AND SELLER=LOW RATING | ITEM NOT AS DESCRIBED | .14 |
| ITEM=NEW AND BUYER=EXPERIENCED | UNPAID ITEM | .01 |

FIG.5

| RULE CONDITION | ACTION(S) TO PERFORM |
|---|---|
| PROBABILITY OF UPI > 90% | BLOCK TRANSACTION |
| PROBABILITY OF UPI > 50% AND PROBABILITY OF ITEM NOT AS DESCRIBED > 30% | ISSUE BUYER AND SELLER WARNING MESSAGES |
| PROBABILITY OF ITEM NOT RECEIVED > 35% | HOLD SELLER FUNDS |
| PROBABILITY OF ITEM NOT AS DESCRIBED > 25% | ISSUE BUYER WARNING MESSAGE |
| PROBABILITY OF UPI < 3% | NO ACTION |

FIG.6

PREDICTING A STATUS OF A TRANSACTION

PRIORITY

This application is a Non-Provisional of and claims the benefit of priority under 35 U.S.C. § 119(e) from U.S. Provisional Application Ser. No. 62/107,255, entitled "PREDICTING A STATUS OF A TRANSACTION," filed on Jan. 23, 2015 which is hereby incorporated by reference herein in its entirety.

TECHNICAL FIELD

Embodiments of the present disclosure relate generally to performing electronic commerce and, more particularly, to predicting a status of a transaction, such as a transaction resulting in an unpaid item (UPI) transaction.

BACKGROUND

Consumers are shopping online for a growing variety of products and services and may conduct searches to locate items that are available for purchase. Consumers are also executing a growing number of transactions online, from banking and loan origination to purchasing products and services. Consumers of the products and services may generally include retail consumers, distributors, small business owners, business representatives, corporate representatives, non-profit organizations, and the like. The providers of the products and/or services may include individuals, retailers, wholesalers, distributors, manufacturers, service providers, small business owners, independent dealers, and the like.

Customer to Customer (C2C) markets provide a commerce environment for customers to interact with each other. In C2C markets, such as the marketplace of the eBay Corporation of San Jose, Calif., a business facilitates an environment where customers can sell their items and/or services to each other. One of the main goals of C2C markets is to provide a safe and successful buying and selling environment. In this environment, buyers may be ensured that they receive their purchased items and sellers are guaranteed that they will receive payments. Businesses facilitating C2C markets have some unique challenges, including handling unpaid items, items not received, items not meeting their descriptions, and the like. C2C businesses try to address these challenges by setting different policies and procedures. Setting policies to prevent a bad user experience may involve accounting for a combination of different factors, such as lack of user experience, accidental orders, and the like.

BRIEF DESCRIPTION OF THE DRAWINGS

Some embodiments are illustrated by way of example and not limitation in the figures of the accompanying drawings, in which:

FIG. 4 is a representation of an example user interface for performing a search for a product and/or service that is available for a purchase transaction, in accordance with an example embodiment;

FIG. 5 is a representation of an example probability table for mapping features of a transaction to an estimated probability of the transaction attaining a corresponding status, in accordance with an example embodiment;

FIG. 6 is a representation of an example action rule base for determining an action to perform based on an estimated probability of a transaction attaining a corresponding status, in accordance with an example embodiment;

DETAILED DESCRIPTION

Figure 1:
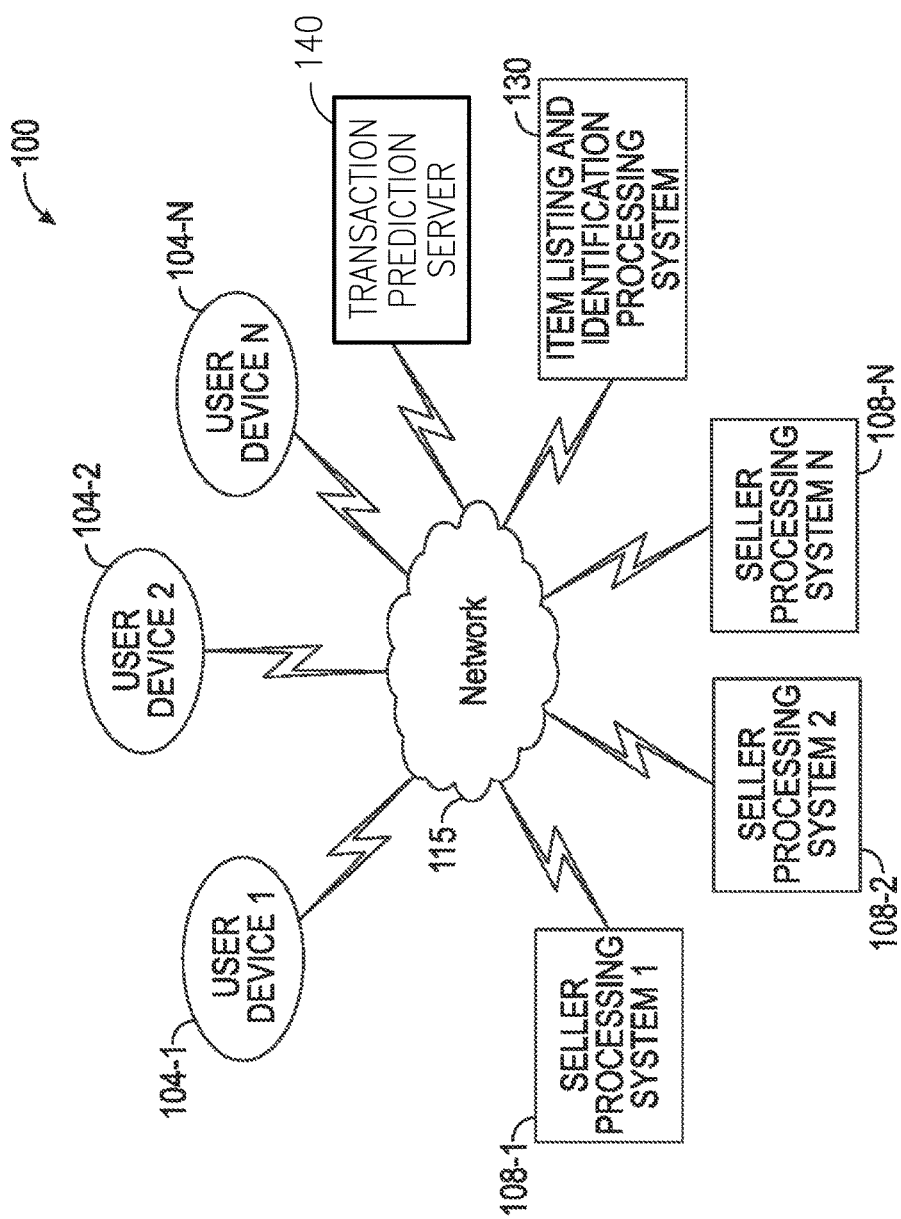
FIG. 1 is a block diagram of an example electronic commerce system for executing a transaction to purchase a product and/or service and predicting a future status of the transaction, in accordance with an example embodiment.

In the following detailed description of example embodiments, reference is made to specific examples by way of drawings and illustrations. These examples are described in sufficient detail to enable those skilled in the art to practice these example embodiments, and serve to illustrate how the invention may be applied to various purposes or embodiments. Other embodiments of the invention exist and are within the scope of the invention, and logical, mechanical, electrical, and other changes may be made without departing from the scope or extent of the present invention. Features or limitations of various embodiments of the invention described herein, however essential to the example embodiments in which they are incorporated, do not limit the invention as a whole, and any reference to the invention, its elements, operation, and application, does not limit the invention as a whole but serves only to define these example embodiments. The following detailed description does not, therefore, limit the scope of the invention, which is defined only by the appended claims.

Generally, methods, systems, and apparatus for predicting a status of a transaction, such as a status of a transaction executed in an electronic commerce system, are described. In one example embodiment, transactions with unpaid items (UPI), where a buyer commits to purchase an item but does not pay for it, may be predicted from transaction-related data, such as user activity data, historical data, behavioral data, and the like. In addition, other situations that may lead to a particular status of a transaction, such as an item not received, a service not performed, a delivery of an item that does not meet an item description, and the like, may be predicted. The predicted status may be used to mitigate or prevent a transaction with a particular status and, potentially, reduce or eliminate bad user experiences.

The predictions are used to identify actions that may be taken to mitigate or eliminate a transaction or the effects of a transaction that is predicted to attain the predicted status. The actions increase the performance of the electronic commerce system, may increase company profitability, and may reduce bad user experiences and improve customer satisfaction. For example, actions may be performed that limit the activities of a user, block a transaction, inform users of potential risks and situations, and the like.

In one example embodiment, a transaction having an unpaid item can be reported by a seller if a buyer commits to purchase an item but does not pay for it within the pay period set by the seller. Different C2C markets have different policies to resolve such UPI transactions. For example, when a UPI transaction closes without payment from the buyer, the seller may be eligible to receive a final value fee credit to their seller account from, for example, the provider of the marketplace. While this policy ensures a safe and successful experience, it is an added cost for the marketplace provider. Preventing UPI transactions will contribute to a safe commerce environment while decreasing marketplace costs.

The root causes of UPI transactions are usually not deterministic and therefore can be difficult to identify. Committing multiple bids in auctions, a lack of buyer's experience, accidental orders, incompetent or malicious sellers, and the like are example causes of UPI transactions. However, not every transaction that is associated with one of the identified causes will result in an unpaid item (e.g., only a small portion of transactions by inexperienced buyers will result in a UPI). As a result, identifying the root factors and, especially, the right combination of causes that lead to a particular transaction status is important to mitigating and/or preventing transactions with unpaid items.

Predicting a UPI transaction at the time of the transaction may be useful to reduce the count of UPI transactions. In one example embodiment, a machine learning algorithm(s) is used to learn the features or combinations of features of a transaction that may lead to a particular transaction status. For example, features related to user activities, historical data, and behavioral data may be used to predict transactions that are likely to result in an unpaid item. In one example embodiment, two predictive models are used to predict UPI transactions based on transaction-related features: a Logistic Regression model with Forward Feature Selection (LR-FFS) and a Random Forest model with Recursive Feature Elimination (RF-RFE). The cited predictive models are able to estimate the probability of a transaction ending up as a UPI transaction based on, for example, the user's current and past data. The proposed technique may also be used to predict other situations, such as "item not received", "item not as described", and the like.

FIG. 1 is a block diagram of an example electronic commerce system 100 for executing a transaction to purchase a product and/or service and predicting a future status of the transaction, in accordance with an example embodiment. In one example embodiment, the electronic commerce system 100 may include one or more user devices 104-1, 104-2, and 104-N (known as user devices 104 hereinafter), one or more optional seller processing systems 108-1, 108-2, and 108-N (known as seller processing systems 108 hereinafter), an item listing and identification processing system 130, a transaction prediction server 140, and a network 115. Each user device (e.g., 104-1) may be a personal computer (PC), a tablet computer, a mobile phone, a personal digital assistant (PDA), a wearable computing device (e.g., a smartwatch), or any other appropriate computer device. Each user device (104-1, 104-2, or 104-N) may include a user interface module, described more fully below in conjunction with FIGS. 3, 4, and 8. In one example embodiment, the user interface module may include a web browser program and/or an application, such as a mobile application. Although a detailed description is only illustrated for the user device 104-1, it is noted that each of the other user devices (e.g., user device 104-2 through user device 104-N) may have corresponding elements with the same functionality.

Each of the optional seller processing systems 108, the item listing and identification processing system 130, and the transaction prediction server 140 may be a server, client, or other processing device that includes an operating system for executing software instructions. The optional seller processing systems 108 may provide listings of items for sale to a consumer, and may facilitate the search for and purchase of the items to a variety of consumers. The transaction prediction server 140 may be a component of the item listing and identification processing system 130 or may be separate from the item listing and identification processing system 130.

The network 115 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, a network of interconnected networks, a combination of two or more such networks, and the like.

Each user device 104 may receive a query for item information from a user via an input device such as a keyboard, touchscreen, microphone, mouse, electronic pen, and the like. An item may include, for example, a product and/or a service, and the corresponding information may be in the form of an item listing.

The item listing and identification processing system 130 of an online listing system may store and/or obtain information related to items available for sale. Each item listing may include a detailed description of the item, a picture of the item, attributes of the item, one or more reviews of the item, and the like. The item associated with the item listing may be a good or product (e.g., a tablet computer) and/or service (e.g., a round of golf or appliance repair) that may be transacted (e.g., by exchanging, sharing information about, buying, selling, making a bid on, and the like). The item listing may also include a title, a category (e.g., electronics, sporting goods, books, antiques, and the like), and attributes and tag information (e.g., color, size, and the like).

The transaction prediction server 140 may be implemented by the apparatus of FIG. 3, as described more fully below. The transaction prediction server 140 generates a model that is used to estimate a probability of a transaction attaining a particular status based on one or more features related to the transaction. The model may be a Logistic Regression model with Forward Feature Selection (LR-FFS), a Random Forest model with Recursive Feature Elimination (RF-RFE), and the like. The transaction prediction server 140 generates an estimate of a probability of a transaction attaining a particular status using the generated model and determines an action(s), if any, to perform based on the probability estimate to mitigate and/or prevent the transaction. The transaction prediction server 140 may, optionally, execute the action(s).

Referring back to the user device 104-1, the query received from the user of the user device 104-1 may include one or more keywords. The user device 104-1 may transmit the query to the item listing and identification processing system 130 via the network 115. The item listing and identification processing system 130 may attempt to match the query keywords with the title, the category, the tag information, and/or any other field in the item listing using a search engine.

In response to the submission of the search query, the item listing and identification processing system 130 may attempt to identify one or more item listings that satisfy the query. The item listing and identification processing system 130 may retrieve and then sort the item listings in the search results in a known manner. The item listing and identification processing system 130 may then return a sorted search result list to the user device 104-1 that submitted the query. The user may select one or more items in order to obtain additional information on the item and/or purchase the item.

Figure 2:
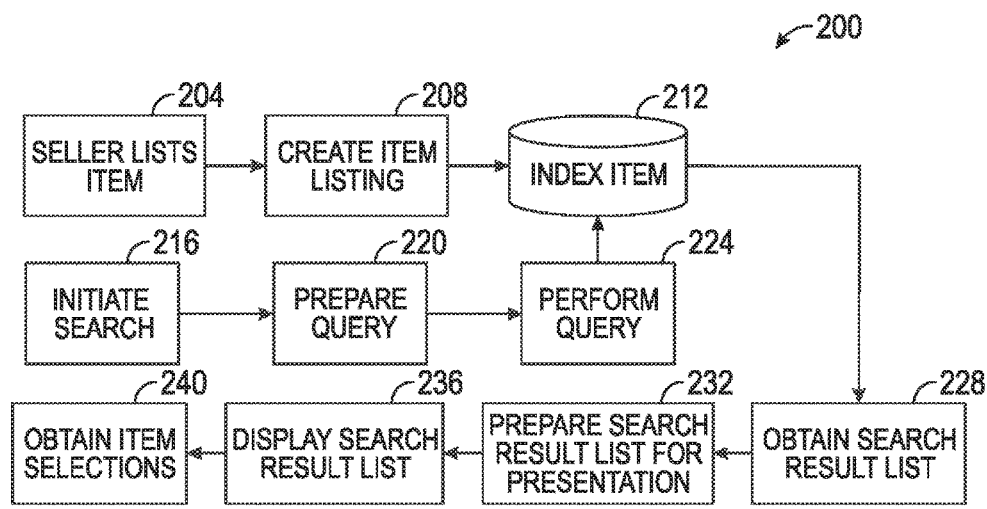
FIG. 2 is a flowchart for an example electronic commerce method for listing, indexing, and searching for a product and/or service, in accordance with an example embodiment.

FIG. 2 is a flowchart for an example electronic commerce method 200 for listing, indexing, and searching for a product and/or service, in accordance with an example embodiment. In one example embodiment, a seller may list an item for sale (operation 204). The seller may, for example, select a category for the item, submit a description of the item, submit a picture of the item, manually set attributes of the item, and the like.

An item listing may be created, for example, in an item listing database (operation 208). The listing may include, for example, attributes of the item and terms of the sale offer. During the item listing operation 208, an identification number for the item listing may be assigned, and the listing may be authenticated and scanned to check for conformance with one or more listing policies. The listed item may be indexed (operation 212) in a known manner to facilitate future searches for the item.

A consumer may initiate a search or query for one or more items (operation 216). For example, a consumer may initiate a search using the keywords "golf clubs." A corresponding query may be prepared (operation 220). For example, a spell check may be performed on the query terms, and a search expression may be generated based on the provided search terms.

The query may be executed on, for example, the items that have been indexed in the system (operation 224). For example, the prepared query may be matched against the index that was updated during operation 212.

In response to the execution of the query, a search result list may be obtained (operation 228). The search result list may be prepared for presentation (operation 232). For example, the search result list may be filtered, sorted, ranked, and/or formatted based, for example, on an analysis of the search result list.

The prepared search result list may be displayed (operation 236). In response to reviewing the displayed search result list, one or more item selections from one or more displayed item pages may be obtained from a user (operation 240).

In one example embodiment, the consumer may conduct a search for an item (e.g., an item available for sale). As used herein, an "item" may refer to a product, a service, a combination of a product and a service, and the like. An item review may also be a component of an item listing provided by an electronic commerce service.

In one example embodiment, the consumer may conduct a search for an item, and the search result set may produce a list of available items of varying degrees of relevance. The consumer may select one or more items in the search result set that may be of interest to the consumer and on which the consumer may desire to receive additional information. The consumer may then execute a transaction to purchase one or more of the items available for sale, and may commit to paying for the item at the time of purchase or after the item has been received.

Figure 3:
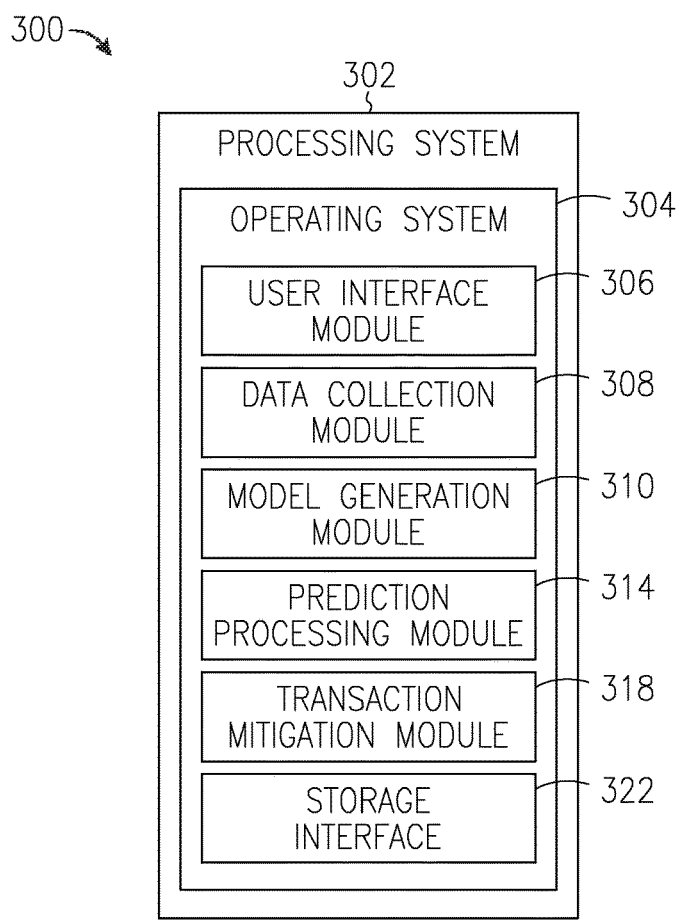
FIG. 3 is a block diagram of an example apparatus for predicting a status of a transaction, in accordance with an example embodiment.

FIG. 3 is a block diagram of an example apparatus 300 for predicting a status of a transaction, in accordance with an example embodiment. The apparatus 300 is shown to include a processing system 302 that may be implemented on a client or other processing device, and that includes an operating system 304 for executing software instructions. The apparatus 300 may be implemented as the transaction prediction server 140.

In accordance with an example embodiment, the apparatus 300 may include a user interface module 306, a data collection module 308, a model generation module 310, a prediction processing module 314, and a transaction mitigation module 318. In accordance with an example embodiment, the apparatus 300 may further include a storage interface 322.

The user interface module 306 enables a user to, for example, configure the model generation module 310, the prediction processing module 314, and the transaction mitigation module 318. A user may, for example, identify the type of learning algorithm(s) to be used for prediction, identify the transaction-related data to be used for prediction, and configure the actions that are to be taken by the transaction mitigation module 318 based on an estimated probability of a transaction attaining a corresponding status, as described more fully below in conjunction with FIGS. 5 and 6. The user interface module 306 provides a user interface, as described more fully below in conjunction with FIG. 8.

The data collection module 308 collects feature data related to a transaction, as described more fully below. The collected data may include user activity data, transactional data, historical data, behavioral data, and the like.

The model generation module 310 generates a model that is used to estimate a probability of a transaction attaining a particular status based on feature data related to the transaction, as described more fully below in conjunction with FIGS. 5, 6, and 7A-7C. As described more fully below, the model may be a Logistic Regression model with Forward Feature Selection, a Random Forest model with Recursive Feature Elimination, and the like. The model is generated using feature data related to executed transactions and the status of each transaction, such as a final status of the transaction, collected by the data collection module 308.

The prediction processing module 314 generates an estimate of a probability of a transaction attaining a particular status using the model generated, for example, by the model generation module 310, as described more fully below in conjunction with FIGS. 5, 6, and 7A-7C.

The transaction mitigation module 318 determines an action to perform based on the probability estimate generated by the prediction processing module 314 and, optionally, executes the action, as described more fully below in conjunction with FIGS. 6 and 7A-7C. The action to be performed may be determined by conducting a lookup of the estimated probability in the action rule base of FIG. 6. The action may prevent the transaction and/or may mitigate one or more effects of the transaction. Example actions include limiting the activities of a user, blocking a transaction, informing users of potential risks and situations, and the like.

Figure 4:
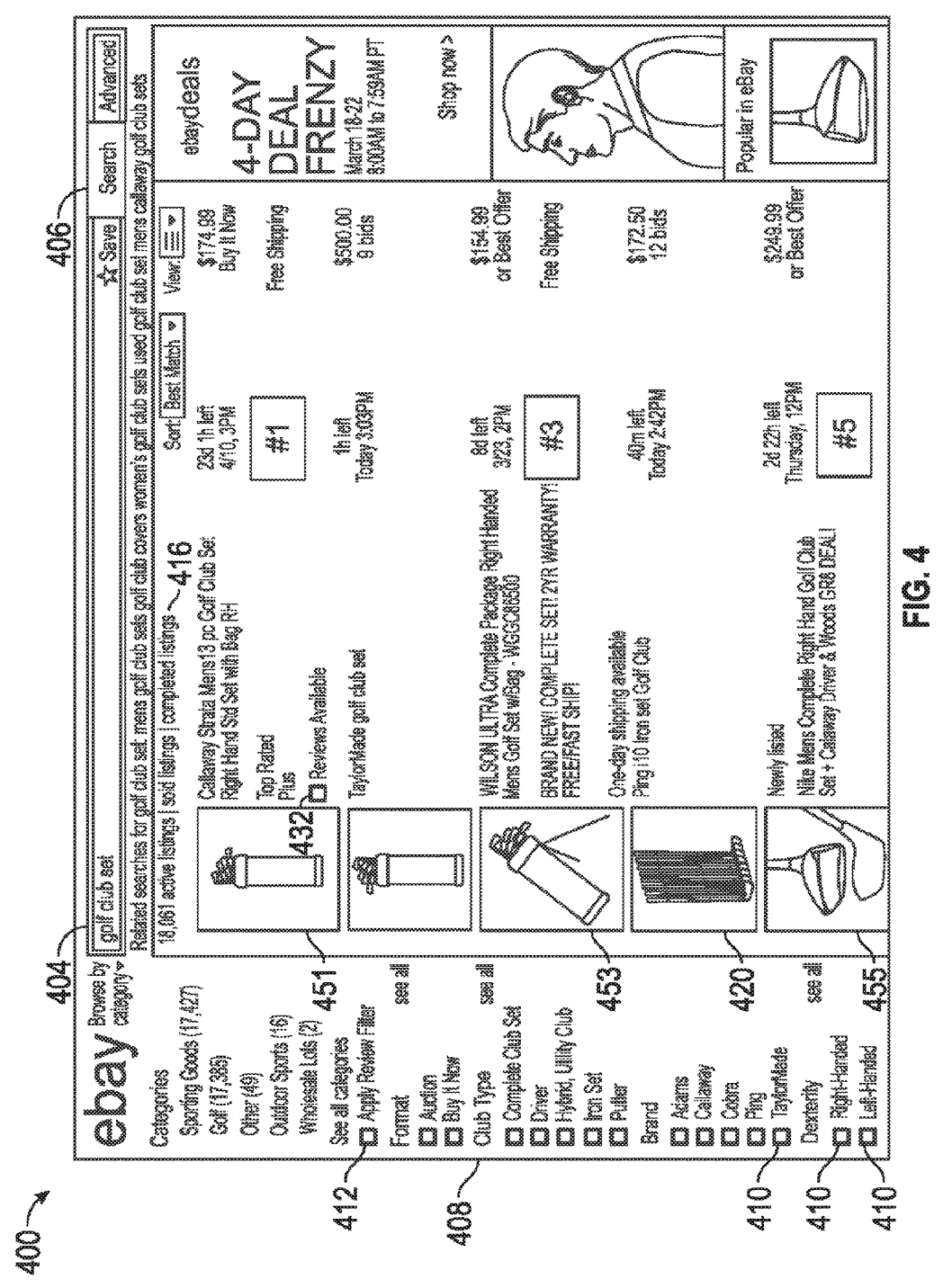

FIG. 4 is a representation of an example user interface 400 for performing a search for a product and/or service that is available for a purchase transaction, in accordance with an example embodiment. In one example embodiment, the user interface 400 may be utilized by the user device 104-1 to enable a user to conduct a search for an item and/or to access an item review.

In one example embodiment, one or more keywords may be entered in an input search field 404, and a search button 406 may be selected to initiate the search. The search may be constrained by search filter settings identified by filter selection indicators 410 in a filter selection area 408. One or more items 420 may be displayed in a search result list area 416. In the example user interface 400, the items 420 displayed in the search result list area 416 are a variety of sets of golf clubs. Golf sets 451, 453, 455 are right-handed golf sets.

In one example embodiment, an "apply review filter" radio button 412 enables a user to activate or deactivate review filter(s). In one example embodiment, a "reviews available" radio button 432 will appear with the item listing if reviews are available for the corresponding item. The "reviews available" radio button 432 may be selected to access one or more of the reviews.

The item(s) identified may then be purchased by the user. The information obtained in searching for the item and/or executing the transaction may be collected by the data collection module 308 for use in training the prediction model and/or predicting a future status of a purchase transaction.

FIG. 5 is a representation of an example probability table 500 for mapping feature data of a transaction to an estimated probability of the transaction attaining a corresponding status, in accordance with an example embodiment. The probability table 500 is generated by the model generation module 310 during training and is based on feature data related to executed transactions and the status of each transaction, such as a final status of the transaction.

In one example embodiment, the probability table 500 comprises a row 504 for each feature value or combination of feature values for which a probability estimate has been generated. Column 508 of the probability table 500 comprises a list of the feature value(s) for a transaction, column 512 lists the type(s) of status that the transaction is predicted to attain, and column 516 indicates the probability that the transaction will attain the corresponding status. As indicated in FIG. 5, a transaction may be associated with an item type (new, used, and the like), a buyer type (new, experienced, and the like), a seller rating (low, medium, high, and the like), and the like. For example, as indicated in the first row of the probability table 500, a transaction for a used item executed by a new buyer has a 4% probability of being an unpaid item transaction. As indicated in the second row of the probability table 500, a transaction executed by a new buyer and a seller who has a low rating has a 12% probability of being an unpaid item transaction and the item not being as described. As indicated in the third row of the probability table 500, a transaction for a new item executed by a seller who has a low rating has a 3% probability of being a transaction with an item that has not been received by the buyer.

FIG. 6 is a representation of an example action rule base 600 for determining an action to perform based on an estimated probability of a transaction attaining a corresponding status, in accordance with an example embodiment. The action rule base 600 may be manually defined by a user and is used by the transaction mitigation module 318 to determine an action(s) to perform based on the probability estimate generated by the prediction processing module 314.

In one example embodiment, each row 604 of the action rule base 600 corresponds to one rule. Column 608 of the action rule base 600 indicates the condition for which the rule applies, such as an estimated probability of a transaction attaining a defined status exceeding a defined threshold. Column 612 indicates the action(s) to perform if the corresponding condition is met. For example, as indicated in the first row of the action rule base 600, a transaction should be blocked if the probability of the transaction resulting in an unpaid item exceeds 90%. As indicated in the second row of the action rule base 600, a warning message should be issued to the buyer and seller if the probability of the transaction resulting in an unpaid item exceeds 50% and the probability of the item not being as described exceeds 30%. As indicated in the third row of the action rule base 600, the funds due the seller from the transaction should be held if the probability of the item not being received by the buyer exceeds 35%. In one example embodiment, the condition of the rule is based on one or more probability estimates and one or more other parameters. For example, the condition may be based on the user being a new user and the probability of the transaction resulting in an unpaid item exceeding 10%.

Figure 7A:
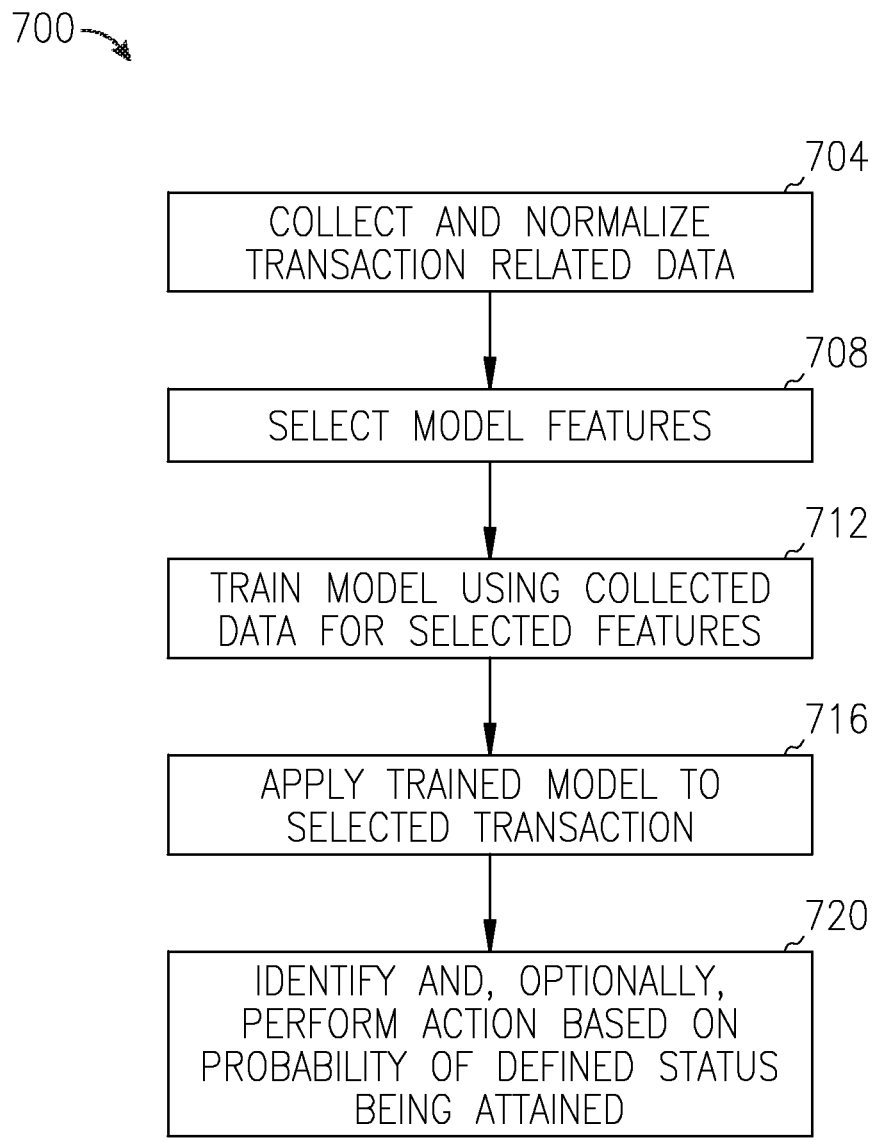
FIG. 7A illustrates a flowchart for an example method for predicting a status of a transaction, in accordance with an example embodiment.

FIG. 7A illustrates a flowchart for an example method 700 for predicting a status of a transaction, in accordance with an example embodiment. In one example embodiment, one or more of the operations of the method 700 may be performed by the model generation module 310, the prediction processing module 314, and/or the transaction mitigation module 318.

In one example embodiment, transaction-related data is collected and normalized (operation 704). For each transaction, data for the buyer, seller, item, and/or transaction is collected. For example, for each seller and buyer, the corresponding user segment (e.g., new user, occasional user, experienced user, and the like), user historical data (e.g., a list of previous purchases/sales, average price, favorite category, and the like), and user behavioral data (e.g., user feedback rating, history of customer service contacts, and the like) are collected. For each item, the corresponding item price, title, category, and the like are collected. For each transaction, the corresponding site identification (e.g., U.S., U.K., and the like), buyer tool (e.g., Web, iPhone, Android, and the like), shipping fee, shipping time, and the like are collected. Collected numerical features are then scaled/normalized since the range of values of raw data for some features (e.g., price) varies widely.

In one example embodiment, after the feature data related to each transaction is collected, a subset of features is selected for use in training a model and predicting the probability estimate (operation 708). In one example embodiment, operations 708 and 712 are combined and the features are selected during the training of the model. For example, in one example embodiment, the evaluation function used to select the features and train the model is based on Forward Feature Selection of a Logistic Regression model. In one example embodiment, the feature evaluation function and training of the model is based on Recursive Feature Elimination of a Random Forest model.

In one example embodiment, the model is trained using the collected transaction-related data (operation 712). In one example embodiment, two models, the Logistic Regression model with Forward Feature Selection and the Random Forest model with Recursive Feature Elimination, are trained and used to predict UPI transactions, as described below in conjunction with FIGS. 7B-7C.

Logistic regression is a type of classification model based on probabilistic statistics. Logistic regression can be used to predict a category of a dependent variable (i.e., a feature), such as a UPI transaction, based on one or more independent variables (i.e., features). The categories may be binary, such as a transaction that is a UPI transaction or is not a UPI transaction. In one example embodiment, logistic regression is used to predict the probability of the dependent feature being in a particular category (such as the probability of the transaction being a UPI transaction).

In one example embodiment, the input features for predicting UPI transactions are selected during the training of the model. A subset of the features that work best as a group to effectively predict UPI transactions may be selected, rather than selecting the features that are individually effective at predicting UPI transactions. The selection of the features may be performed with either forward selection and/or backward elimination. Examples of the input features include user activity data, historical data, behavioral data, and the like, such as item type (new, used, and the like), buyer experience (new, experienced, and the like), seller rating (high, low, and the like), and the like.

In one example embodiment, one model is trained for each leaf-category of items (e.g., memory cards, calculators, mobile phones, and the like) in a tree of item categories, as each feature may have a different impact on different leaf-categories. In one example embodiment, only one of the models is generated and used to predict the UPI transactions.

In one example embodiment, the trained model(s) is applied to a new transaction(s) (operation 716). The trained model may be applied at the time the transaction is executed (for example, when a buyer commits to purchasing an item). The features of the current transaction (e.g., features of the buyer, seller, item, transaction, and the like) are processed using the trained model, and a probability that the processed transaction attains a particular status, such as resulting in an unpaid item, is estimated (where the probability is in the range of zero to one).

In one example embodiment, mitigating and/or preventive actions may be taken for one or more of the processed transactions (operation 720). The actions taken, if any, may be based on the estimated probability (corresponding to the transaction) being above a threshold level. The action(s) to be performed may be determined by processing the rules of the action rule base 600. For example, if the probability of the transaction attaining a selected status (e.g., a UPI status) is greater than 90%, the transaction may be blocked from execution. If the probability is less than 2%, no action may be taken. In one example, if the buyer is a new user and the probability is greater than 10%, a message may be issued to the buyer indicating that the item description, price, and shipping fee should be doublechecked. In one example, a buyer may be blocked from making a purchase if the buyer has a history of unpaid items. In other examples, if the probability of the transaction resulting in an unpaid item is less than 0.01%, the seller may be sent a message suggesting that the seller give the buyer a few extra days to pay for the item before opening a claim. If the probability of the transaction resulting in an unpaid item is greater than 90%, the seller may be sent a message suggesting that the seller open a claim without contacting customer service.

As described below in conjunction with FIG. 8, different action rule bases 600 may be defined and selected for use. For example, different action rule bases 600 may be available for different types of items, for different countries, and the like.

In one example embodiment, operations 704-712 are performed once and operations 716-720 are performed for each transaction for which a prediction is to be generated. In one example embodiment, operations 704-712 are periodically performed for a subset of the new transactions in order to update the prediction model(s). The operations 704-720 may also be performed for any new transaction in order to continuously update the prediction model(s).

Figure 7B:
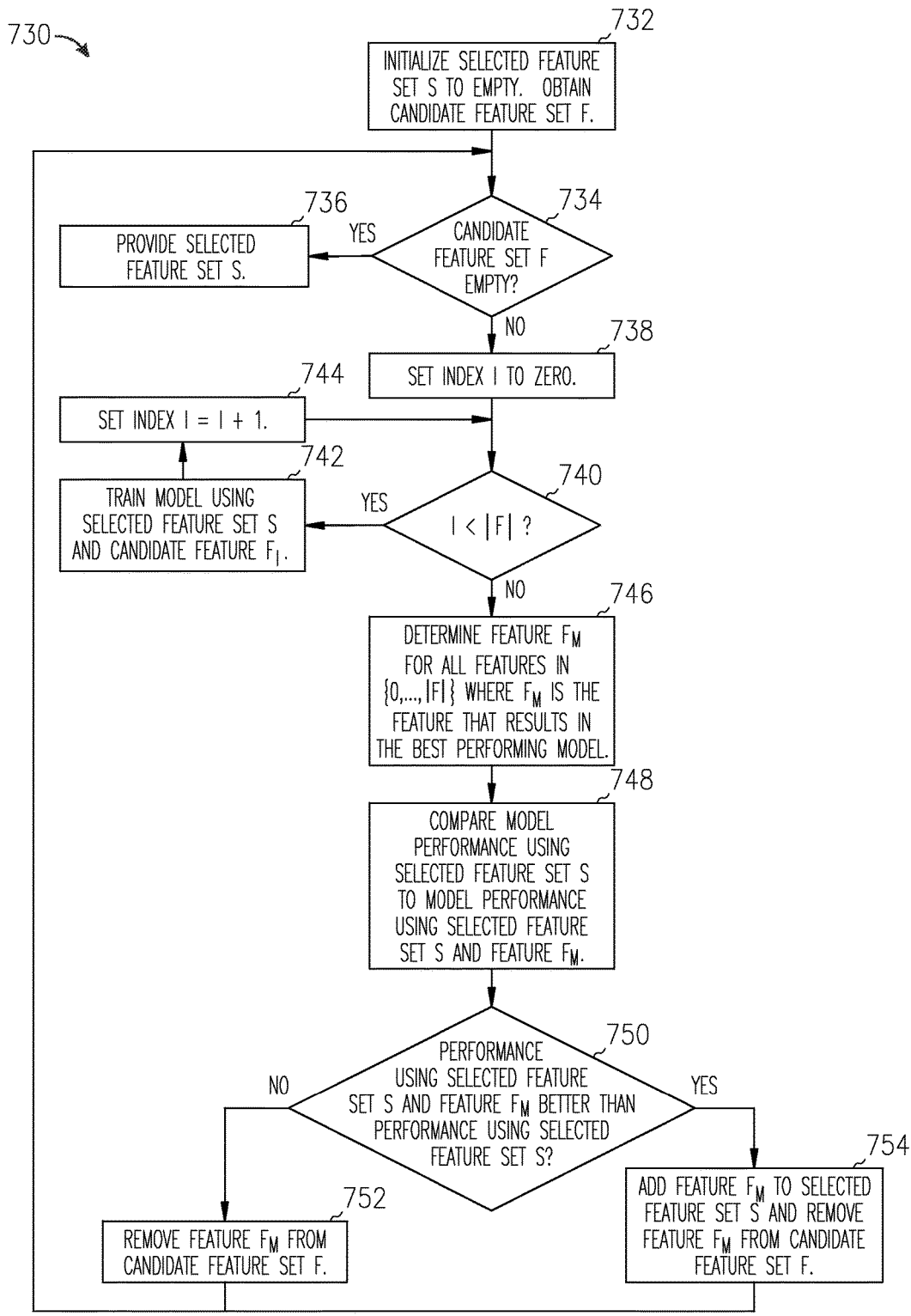
FIG. 7B illustrates a flowchart for an example method for training a model to predict a status of a transaction using forward selection, in accordance with an example embodiment.

FIG. 7B illustrates a flowchart for an example method 730 for training a model to predict a status of a transaction using forward selection, in accordance with an example embodiment. In one example embodiment, the method 730 is used to perform operations 708-712 of FIG. 7A and one or more of the operations of the method 730 are performed by the model generation module 310, the prediction processing module 314, and/or the transaction mitigation module 318.

In one example embodiment, a candidate feature set F containing candidate features is obtained and a selected feature set S is initialized to empty (operation 732). A test is then performed to determine if the candidate feature set F is empty (operation 734). If the candidate feature set F is empty, the selected feature set S is provided to, for example, the method 700 (operation 736), and the method 730 ends; otherwise, an index i is set to zero (operation 738).

A test is then performed to determine if the index i is less than the current count of features in the candidate feature set F (operation 740). If the index i is not less than the current count of features in the candidate feature set F, then the method 730 proceeds with operation 746; otherwise, the model is trained using the selected feature set S and a candidate feature $F_i$ (operation 742) and the index i is incremented by one (operation 744). Operations 740-744 are repeated for each candidate feature $F_i$ in the candidate feature set F. Based on operations 740-744, a model is trained for each combination of the selected feature set S and one of the pending candidate features $F_i$.

During operation 746, a determination is made of which feature $F_m$ provided the best-performing model of all the models generated since the last performance of operation 738. The performance of the model using the selected feature set S is compared to the performance of the model using the selected feature set S and the feature $F_m$ (operation 748). A test is then performed to determine if the performance of the model using the selected feature set S and the feature $F_m$ is better than the performance of the model using the selected feature set S (operation 750). If the performance of the model using the selected feature set S and the feature $F_m$ is better than the performance of the model using the selected feature set S, then the feature $F_m$ is added to the selected feature set S and is removed from the candidate feature set F (operation 754); otherwise, the feature $F_m$ is removed from the candidate feature set F (operation 752). The method 730 then proceeds with operation 734.

Figure 7C:
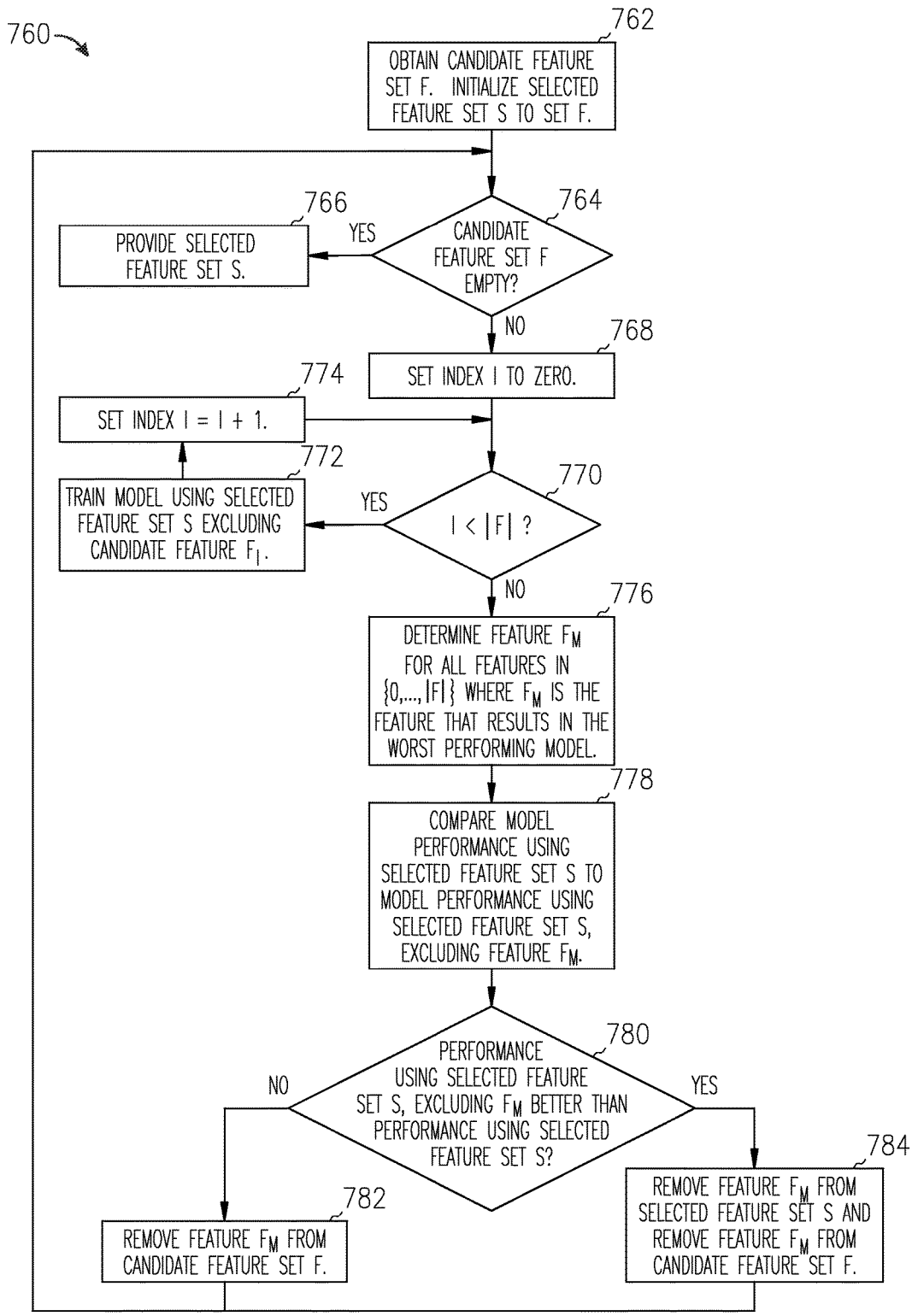
FIG. 7C illustrates a flowchart for an example method for training a model to predict a status of a transaction using backward elimination, in accordance with an example embodiment.

FIG. 7C illustrates a flowchart for an example method 760 for training a model to predict a status of a transaction using backward elimination, in accordance with an example embodiment. In one example embodiment, the method 760 is used to perform operations 708-712 of FIG. 7A and one or more of the operations of the method 760 are performed by the model generation module 310, the prediction processing module 314, and/or the transaction mitigation module 318.

In one example embodiment, a candidate feature set F containing candidate features is obtained and a selected feature set S is initialized to the candidate feature set F (i.e., the selected feature set S is initialized to contain all of the features in the candidate feature set F; operation 762). A test is then performed to determine if the candidate feature set F is empty (operation 764). If the candidate feature set F is empty, the selected feature set S is provided to, for example, the method 700 (operation 766), and the method 760 ends; otherwise, an index i is set to zero (operation 768).

A test is then performed to determine if the index i is less than the current count of features in the candidate feature set F (operation 770). If the index i is not less than the current count of features in the candidate feature set F, then the method 760 proceeds with operation 776; otherwise, the model is trained using the selected feature set S, excluding a candidate feature $F_i$ (operation 772), and the index i is incremented by one (operation 774). Operations 770-774 are repeated for each candidate feature $F_i$ in the candidate feature set F. Based on operations 770-774, a model is trained for each combination of the selected feature set S, excluding one of the pending candidate features $F_i$.

During operation 776, a determination is made of which feature $F_m$ provided the worst-performing model of all the models generated since the last performance of operation 768. The performance of the model using the selected feature set S is compared to the performance of the model using the selected feature set S, excluding the feature $F_m$ (operation 778). A test is then performed to determine if the performance of the model using the selected feature set S, excluding the feature $F_m$, is better than the performance of the model using the selected feature set S (operation 780). If the performance of the model using the selected feature set S, excluding the feature $F_m$, is better than the performance of the model using the selected feature set S, then the feature $F_m$ is removed from the selected feature set S and is removed from the candidate feature set F (operation 784); otherwise, the feature $F_m$ is removed from the candidate feature set F (operation 782). The method 760 then proceeds with operation 764.

Figure 8:
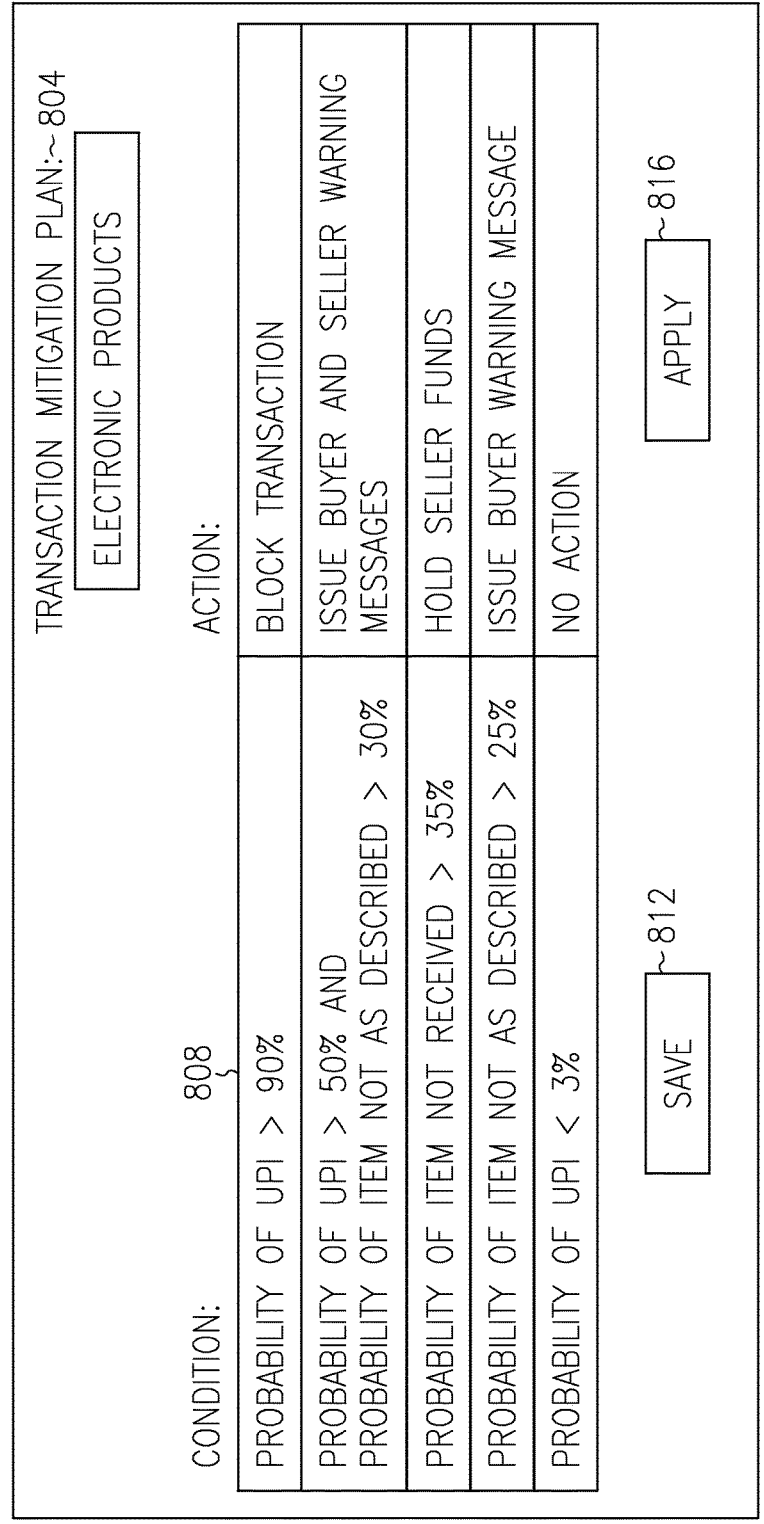
FIG. 8 is a representation of an example user interface for defining an action to perform based on an estimated probability of a transaction attaining a corresponding status, in accordance with an example embodiment.

FIG. 8 is a representation of an example user interface 800 for defining an action to perform based on an estimated probability of a transaction attaining a corresponding status, in accordance with an example embodiment. In one example embodiment, the actions are identified and/or performed by the transaction mitigation module 318.

In one example embodiment, a name of a transaction mitigation plan is entered in a transaction mitigation plan text field 804. In response to entry of the name of the transaction mitigation plan, the corresponding action rule base 600 (FIG. 6) is accessed and displayed in a rule base section 808. If the named transaction mitigation plan does not exist, a blank action rule base 600 is displayed in the rule base section 808. Each rule in the action rule base 600 may then be manually defined in the rule base section 808. Selection of a save button 812 will cause the defined action rule base 600 to be saved for future use under the named transaction mitigation plan. Selection of an apply button 816 will cause the defined action rule base 600 to be saved under the named transaction mitigation plan and to be activated for use in processing new transactions.

Figure 9:
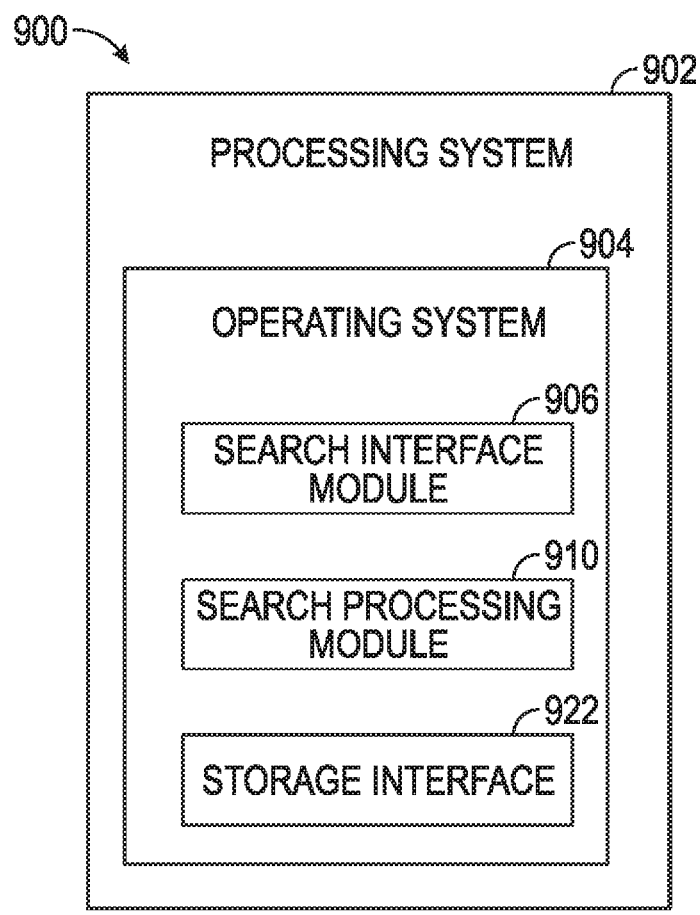
FIG. 9 is a block diagram of an example apparatus for performing a search for products and/or services, in accordance with an example embodiment.

FIG. 9 is a block diagram of an example apparatus 900 for performing a search for products and/or services, in accordance with an example embodiment. The apparatus 900 is shown to include a processing system 902 that may be implemented on a client or other processing device, and that includes an operating system 904 for executing software instructions. In accordance with an example embodiment, the apparatus 900 may include a search interface module 906 and a search processing module 910. In accordance with an example embodiment, the apparatus 900 may further include a storage interface 922. In one example embodiment, the apparatus 900 may be a component of the item listing and identification processing system 130.

The search interface module 906 may obtain search terms and consumer filter selections from the user device 104-1; may provide a search result list to the user device 104-1; and may obtain consumer item selections from the user device 104-1. The search processing module 910 may conduct a search for items in a known manner based on the search terms and consumer filter selections from the user device 104-1, and may generate the search result list for the user device 104-1. The storage interface 922 may provide access to databases containing item listings. For example, the storage interface 922 may provide access to storage listings within the seller processing systems 108.

Although certain examples are shown and described here, other variations exist and are within the scope of the invention. It will be appreciated, by those of ordinary skill in the art, that any arrangement, which is designed or arranged to achieve the same purpose, may be substituted for the specific embodiments shown. This application is intended to cover any adaptations or variations of the example embodiments of the invention described herein. It is intended that this invention be limited only by the claims, and the full scope of equivalents thereof.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via the network 115 (e.g., the Internet) and via one or more appropriate interfaces (e.g., application program interfaces (APIs)).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by the network 115.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through the network 115. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
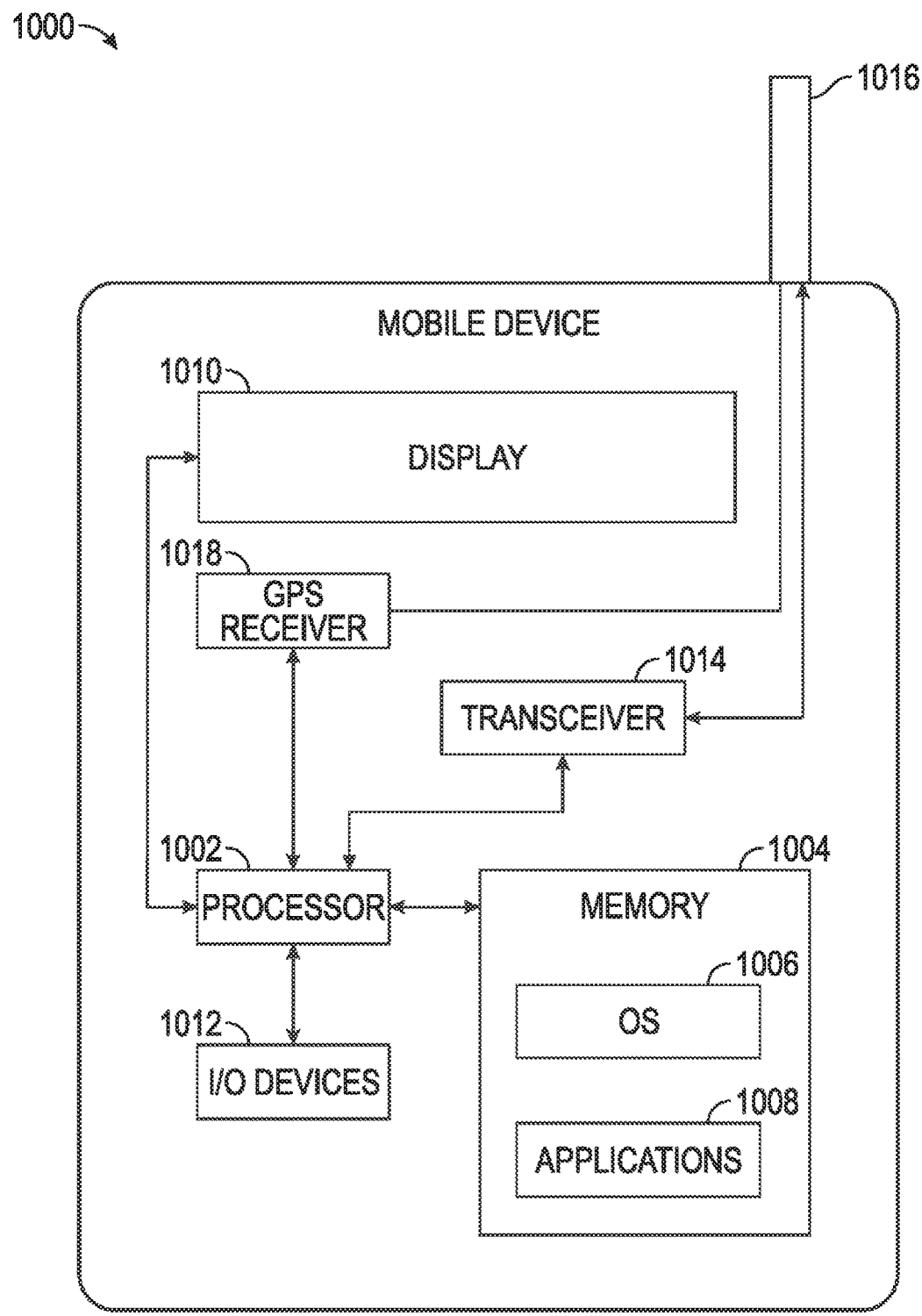
FIG. 10 is a block diagram illustrating a mobile device, according to an example embodiment.

FIG. 10 is a block diagram illustrating a mobile device 1000, according to an example embodiment. The mobile device 1000 can include a processor 1002. The processor 1002 can be any of a variety of different types of commercially available processors suitable for mobile devices 1000 (for example, an XScale architecture microprocessor, a Microprocessor without Interlocked Pipeline Stages (MIPS) architecture processor, or another type of processor). A memory 1004, such as a random access memory (RAM), a flash memory, or another type of memory, is typically accessible to the processor 1002. The memory 1004 can be adapted to store an operating system (OS) 1006, as well as applications 1008, such as a mobile location-enabled application that can provide location-based services (LBSs) to a user. The processor 1002 can be coupled, either directly or via appropriate intermediary hardware, to a display 1010 and to one or more input/output (I/O) devices 1012, such as a keypad, a touch panel sensor, and a microphone. Similarly, in some embodiments, the processor 1002 can be coupled to a transceiver 1014 that interfaces with an antenna 1016. The transceiver 1014 can be configured to both transmit and receive cellular network signals, wireless data signals, or other types of signals via the antenna 1016, depending on the nature of the mobile device 1000. Further, in some configurations, a GPS receiver 1018 can also make use of the antenna 1016 to receive GPS signals.

Figure 11:
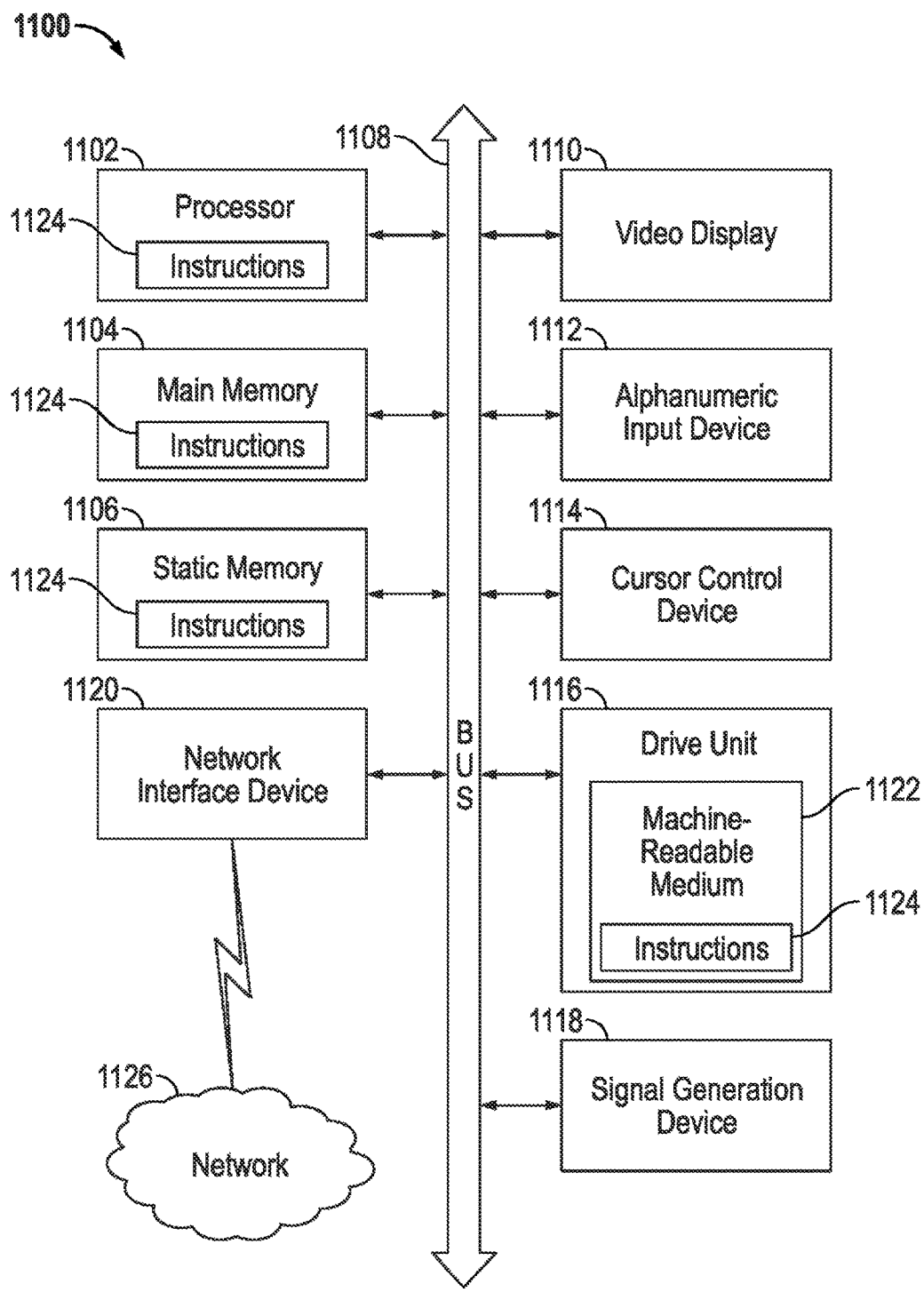
FIG. 11 is a block diagram of a machine within which instructions may be executed for causing the machine to perform any one or more of the methodologies discussed herein.

FIG. 11 is a block diagram of a machine in the form of an example computer system 1100 within which instructions may be executed for causing the machine to perform any one or more of the methodologies discussed herein. In one example embodiment, the machine may be the example apparatus 300 of FIG. 3 for predicting a status of a transaction and/or the example apparatus 900 of FIG. 9 for performing a search for products and/or services. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a cursor control device 1114 (e.g., a mouse), a drive unit 1116, a signal generation device 1118 (e.g., a speaker), and a network interface device 1120.

Machine-Readable Medium

The drive unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media. The instructions 1124 may also reside within the static memory 1106.

While the machine-readable medium 1122 is shown in an example embodiment to be a single medium, the term "machine-readable medium" may include a single medium or multiple media (e.g., a centralized or distributed database, and/or associated caches and servers) that store the one or more data structures or instructions 1124. The term "machine-readable medium" shall also be taken to include any tangible medium that is capable of storing, encoding, or carrying instructions 1124 for execution by the machine and that cause the machine to perform any one or more of the methodologies of the present invention, or that is capable of storing, encoding, or carrying data structures utilized by or associated with such instructions 1124. The term "machine-readable medium" shall accordingly be taken to include, but not be limited to, solid-state memories, and optical and magnetic media. Specific examples of machine-readable media 1122 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. The machine readable medium 1122 specifically excludes signals per se.

Transmission Medium

The instructions 1124 may further be transmitted or received over a communications network 1126 using a transmission medium. The instructions 1124 may be transmitted using the network interface device 1120 and any one of a number of well-known transfer protocols (e.g., Hypertext Transfer Protocol (HTTP)). Examples of communication networks 1126 include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1124 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system for predicting a status of a transaction, the system comprising:
   a data collection module implemented on a transaction prediction server, the data collection module collecting feature data related to one or more transactions;
   a model generation module implemented on the transaction prediction server, the model generation module selecting a subset of features for use in predicting the status of the transaction and training a model using the collected feature data that corresponds to the selected subset of features;
   a prediction processing module implemented on the transaction prediction server, the prediction processing module applying the model to feature data of a selected transaction between a buyer and a seller to generate a probability of the selected transaction attaining one or more defined statuses; and
   a transaction mitigation module implemented on the transaction prediction server, the transaction mitigation module configured to perform one or more mitigating or preventive actions based on the generated probability, the one or more mitigating or preventive actions determined based on a user-defined mapping between probability rule conditions corresponding to the one or more defined statuses and corresponding actions to be performed, wherein the one or more mitigating or preventive actions comprise one or more of blocking the selected transaction, communicating a warning to the buyer and the seller via user devices corresponding to the buyer and seller, or holding funds due to the seller.

2. The system of claim 1, wherein the data collection module is further configured to normalize the collected feature data.

3. The system of claim 1, wherein the feature data is collected for one or more of a buyer, a seller, an item, and a transaction.

4. The system of claim 1, wherein the collected feature data comprises one or more of user segment data, user historical data, user behavioral data, an item price, an item title, an item category, a transaction site identifier, a buyer tool, a shipping fee, and a shipping time.

5. The system of claim 1, wherein the model is a Logistic Regression model.

6. The system of claim 5, wherein the subset of features is selected using a Forward Feature Selection mechanism of the Logistic Regression model.

7. The system of claim 1, wherein the model is a Random Forest model.

8. The system of claim 7, wherein the subset of features is selected using a Recursive Feature Elimination mechanism of the Random Forest model.

9. The system of claim 1, wherein the model is trained for each of a plurality of leaf-categories of items.

10. The system of claim 1, wherein the one or more mitigating or preventive actions are one or more of issuing a message to a buyer, issuing a message to a seller, blocking the buyer from executing the transaction, blocking the seller from executing the transaction, and holding funds of the seller.

11. A method for predicting a status of a transaction, the method comprising:
    collecting feature data related to one or more transactions;
    selecting a subset of features for use in predicting the status of the transaction;
    training a model using the collected feature data that corresponds to the selected subset of features;
    applying the model to feature data of a selected transaction to generate a probability of the selected transaction attaining one or more defined statuses;
    determining one or more mitigating or preventive actions, the determining based on a user-defined mapping between probability rule conditions corresponding to the one or more defined statuses and corresponding actions to be performed; and
    performing the one or more mitigating or preventive actions, the one or more mitigating or preventive actions being one or more of blocking the selected transaction, communicating a warning to the buyer and the seller via user devices corresponding to the buyer and seller, or holding funds due to the seller.

12. The method of claim 11, further comprising normalizing the collected feature data.

13. The method of claim 11, wherein the feature data is collected for one or more of a buyer, a seller, an item, and a transaction.

14. The method of claim 11, wherein the collected feature data comprises one or more of user segment data, user historical data, user behavioral data, an item price, an item title, an item category, a transaction site identifier, a buyer tool, a shipping fee, and a shipping time.

15. The method of claim 11, wherein the model is a Logistic Regression model.

16. The method of claim 15, wherein the subset of features is selected using a Forward Feature Selection mechanism of the Logistic Regression model.

17. The method of claim 11, wherein the model is a Random Forest model.

18. The method of claim 17, wherein the subset of features is selected using a Recursive Feature Elimination mechanism of the Random Forest model.

19. The method of claim 11, wherein the model is trained for each of a plurality of leaf-categories of items.

20. A non-transitory computer-readable medium embodying instructions that, when executed by a processor, perform operations comprising:
    collecting feature data related to one or more transactions;
    selecting a subset of features for use in predicting a status of at least one of the transactions;
    training a model using the collected feature data that corresponds to the selected subset of features;
    applying the model to feature data of a selected transaction to generate a probability of the selected transaction attaining one or more defined statuses;
    determining one or more mitigating or preventive actions, the determining based on a user-defined mapping between probability rule conditions corresponding to the one or more defined statuses and corresponding actions to be performed; and
    performing the one or more mitigating or preventive actions, the one or more mitigating or preventive actions being one or more of blocking the selected transaction, communicating a warning to the buyer and the seller via user devices corresponding to the buyer and seller, or holding funds due to the seller.

* * * * *